United States Patent
Zhou et al.

(10) Patent No.: US 12,107,820 B2
(45) Date of Patent: Oct. 1, 2024

(54) HOST VIRTUAL MACHINE DOMAIN NAME SYSTEM (DNS) CACHE ENABLING DNS RESOLUTION DURING NETWORK CONNECTIVITY ISSUES

(71) Applicant: Microsoft Technology Licensing, LLC, Redmond, WA (US)

(72) Inventors: Han Zhou, Seattle, WA (US); Steven Carl Anderson, Seattle, WA (US); KyuWang Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/193,235

(22) Filed: Mar. 30, 2023

(65) Prior Publication Data

US 2024/0179117 A1 May 30, 2024

Related U.S. Application Data

(60) Provisional application No. 63/385,139, filed on Nov. 28, 2022.

(51) Int. Cl.
*H04L 61/4511* (2022.01)
*G06F 9/455* (2018.01)

(52) U.S. Cl.
CPC ...... *H04L 61/4511* (2022.05); *G06F 9/45558* (2013.01); *G06F 2009/45595* (2013.01)

(58) Field of Classification Search
CPC ............. H04L 61/4511; G06F 9/45558; G06F 2009/45595; G06F 2009/45558; G06F 2009/455583
See application file for complete search history.

(56) References Cited

U.S. PATENT DOCUMENTS

| | | | |
|---|---|---|---|
| 10,243,919 B1 * | 3/2019 | Suresh | ............... H04L 67/1001 |
| 11,102,171 B2 * | 8/2021 | Vaikar | ............... H04L 61/4511 |

(Continued)

FOREIGN PATENT DOCUMENTS

| | | |
|---|---|---|
| CN | 106550056 B | 9/2019 |
| EP | 3903472 A1 | 11/2021 |
| WO | 2021120970 A1 | 6/2021 |

OTHER PUBLICATIONS

Liu, et al, "Distributed Local DNS System and Domain Name Inquiry Method", Jun. 24, 2021, WO 2021/120970 A1 (English Translation), pp. 1-41 (Year: 2021).*

(Continued)

*Primary Examiner* — Jonathan A Bui (57) ABSTRACT

Examples of the present disclosure describe systems and methods for using a host DNS local cache to enable DNS resolution during network connectivity issues. In examples, a DNS request from a virtual environment executing on a host device is received by a DNS forwarder implemented within the host device. The DNS forwarder determines that a DNS resolver external to the host device is unreachable to provide a DNS response for a domain name in the DNS request. In response to determining the DNS resolver is unreachable, the DNS forwarder identifies a DNS response corresponding to the domain name within a DNS local cache implemented within the host device. The DNS forwarder provides the DNS response to the virtual environment to satisfy the DNS request.

20 Claims, 5 Drawing Sheets

(56) References Cited

U.S. PATENT DOCUMENTS

| | | | | |
|---|---|---|---|---|
| 2007/0294419 A1* | 12/2007 | Ulevitch | ............. | H04L 61/4511 |
| | | | | 709/230 |
| 2010/0332680 A1* | 12/2010 | Anderson | ........... | H04L 61/4511 |
| | | | | 709/245 |
| 2012/0072569 A1* | 3/2012 | Xu | .......................... | H04L 69/40 |
| | | | | 709/223 |
| 2013/0198269 A1 | 8/2013 | Fleischman et al. | | |
| 2014/0195692 A1* | 7/2014 | Treuhaft | ................. | H04L 61/35 |
| | | | | 709/229 |
| 2017/0048187 A1* | 2/2017 | Tan | ..................... | H04L 63/1416 |
| 2019/0158459 A1* | 5/2019 | Vaikar | ................. | H04L 61/4552 |
| 2019/0342390 A1* | 11/2019 | Lancu | ..................... | H04L 67/62 |
| 2020/0404066 A1 | 12/2020 | Sinha | | |

OTHER PUBLICATIONS

"K55502976: Big-IP DNS/DNS Services | Big-IP LTM-DNS Operations Guide", Retrieved From: https://support.f5.com/csp/article/K55502976, Oct. 9, 2018, 26 Pages.

International Search Report and Written Opinion received for PCT Application No. PCT/US2023/036635, (MS# 412532-PCT01) mailed on Jan. 24, 2024, 14 pages.

Lawrence, et al., "Serving Stale Data to Improve DNS Resiliency", Internet Engineering Task Force (IETF), Apr. 1, 2020, 7pages.

\* cited by examiner

HOST VIRTUAL MACHINE DOMAIN NAME SYSTEM (DNS) CACHE ENABLING DNS RESOLUTION DURING NETWORK CONNECTIVITY ISSUES

CROSS-REFERENCE TO RELATED APPLICATIONS

This application claims the benefit of U.S. Provisional Application. No. 63/385,139 filed Nov. 28, 2022, entitled "Host Virtual Machine Domain Name System (DNS) Cache Enabling DNS Resolution During Network Connectivity Issues," which is incorporated herein by reference in its entirety.

BACKGROUND

Network resiliency is an important consideration in many networking environments. Currently, when a network issue occurs between a computing device and a Domain Name System (DNS) service, the domain names in the DNS requests sent by the computing device cannot be resolved by the DNS service. When domain names cannot be resolved, the DNS requests fail, which cause workloads and processes executed by the computing device to fail or be negatively impacted. These request failures are often disruptive and can be costly for users of the computing device.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for using a host DNS local cache to enable DNS resolution during network connectivity issues. In examples, a DNS request from a virtual environment executing on a host device is received by a DNS forwarder implemented within the host device. The DNS forwarder determines that a DNS resolver external to the host device is unreachable to provide a DNS response for a domain name in the DNS request. In response to determining the DNS resolver is unreachable, the DNS forwarder identifies a DNS response corresponding to the domain name within a DNS local cache implemented within the host device. The DNS forwarder provides the DNS response to the virtual environment to satisfy the DNS request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

As cloud computing continues to evolve, various components of cloud computing environments have been moved from centralized datacenters to edge computing sites, which provide a distributed computing paradigm that brings computation and data storage closer to the sources of data. Due to this distribution of computing components, network resiliency has become increasingly important in such computing environments. As one example, during a connection issue between an edge computing site and DNS services implemented within a centralized datacenter, the domain names in the DNS requests from the edge computing site will be unable to be processed by the DNS services. Consequently, the domain names will not be resolved, which will cause disruption to or the failure of computing devices and/or computing environments within the edge computing sites.

The present disclosure provides a solution that enables a DNS local cache of a host device to be used to facilitate DNS resolution during network connectivity issues between computing environments and DNS services. In embodiments of the present disclosure, a virtual environment (e.g., a virtual machine (VM) or a container) executing in a host environment of a host device generates a DNS request to access address information (e.g., Internet Protocol (IP) address information) associated with a domain name. A domain name, as used herein, is a string of characters that is a human readable form of an IP address. The DNS request is sent by the virtual environment to a DNS forwarder implemented in the host device. The DNS forwarder attempts to send the DNS request to a DNS resolver that is external to the host device. In examples, the host device is implemented in an edge computing site and the DNS resolver is implemented in a centralized datacenter.

If the DNS resolver is reachable (e.g., active and communicatively accessible) by the DNS forwarder, the DNS resolver provides a DNS response for the DNS request to the DNS forwarder. In examples, the DNS response comprises information, such as transaction identifier, domain name, DNS record type (e.g., "A" for an IP version 4 (IPv4) host address, "AAAA" for an IP version 6 (IPv6) host address, CNAME (canonical name for a domain name alias)), response code (indicating whether errors were encountered during the domain name lookup), the number of DNS records returned by the DNS request, the DNS records (resolved IP addresses), time to live (TTL) values (the amount of time the DNS record can be stored), DNS response data length (a count of octets in the DNS response), network protocol used to transport the DNS request and/or DNS response (e.g., transmission control protocol (TCP), user datagram protocol (UDP), hypertext transfer protocol (HTTP)), and virtual environment virtual network (VNET)

identifier (enables virtual environments and other resources to securely communicate with each other, the internet, and on-premises networks).

Upon receiving the DNS response, the DNS forwarder stores the DNS response and/or information associated with the DNS response (collectively referred to as "DNS response information") in a DNS local cache implemented in the host device. In examples, the DNS local cache supports multiple modes of caching, such as in-memory caching (in which cache entries are maintained until the host device is rebooted or intentionally cleared) and persistent caching (in which cache entries persist through reboots using, for example, extensible storage techniques). In some examples, the DNS response information is stored in the DNS local cache as a key/value pair such that the key portion of the key/value pair is a primary key for the DNS response and the value portion of the key/value pair is the DNS response. The primary key may comprise DNS response information, such as domain name, DNS record type, network protocol, virtual environment VNET identifier, and transaction identifier. The value portion of the key/value pair may store the raw data for the DNS response and a "last-used" timestamp indicating the most recent time that a domain name was requested from the DNS resolver. Alternatively, the value portion of the key/value pair may store a processed version of the DNS response. For instance, the data values in the DNS response may be parsed and stored such that each data value is separated using delimiters.

In some examples, upon attempting to store the DNS response in the DNS local cache, the DNS forwarder determines that the DNS response already exists as an entry in the DNS local cache. For instance, the DNS response has been added to the DNS local cache in response to a previous DNS request for the domain name in the current DNS request. In such examples, the DNS forwarder may leave the existing entry for the DNS response unmodified, overwrite the existing entry for the DNS response, or update a portion of the existing entry (such as the last-used timestamp). After storing (or determining not to store) the DNS response in the DNS local cache, the DNS forwarder sends the DNS response to the virtual environment that generated the DNS request.

If the DNS resolver is unreachable by the DNS forwarder, the DNS forwarder searches the DNS local cache for an entry comprising the domain name provided in the DNS request. If an entry comprising the domain name is not found in the DNS local cache, the DNS forwarder notifies the virtual environment that the DNS request failed (e.g., the domain name could not be resolved). If, however, an entry comprising the domain name is found in the DNS local cache, the DNS forwarder retrieves the DNS response associated with the domain name from the DNS local cache and provides the DNS response to the virtual environment. In some examples, prior to providing the retrieved DNS response to the virtual environment, the DNS forwarder alters the transaction identifiers for the retrieved DNS response to match the transaction identifiers for the current DNS request. This alteration of transaction identifiers is performed regardless of whether the TTL value for the stored DNS response has expired. Accordingly, although the DNS response provided to the virtual environment may no longer be valid, providing the last known correct DNS response to the virtual environment is considered preferable to simply allowing the DNS request to fail.

As such, the present disclosure provides a plurality of technical benefits and improvements over previous DNS resolution solutions, such as implementation of a DNS local cache on a host device and providing a last known correct DNS response for a domain name when a DNS resolver is unreachable by a DNS forwarder of the host device. These technical benefits and improvements enable business critical workloads to continue to execute during network failures and periods during which the host device is unable to connect to a DNS resolver.

Figure 1:
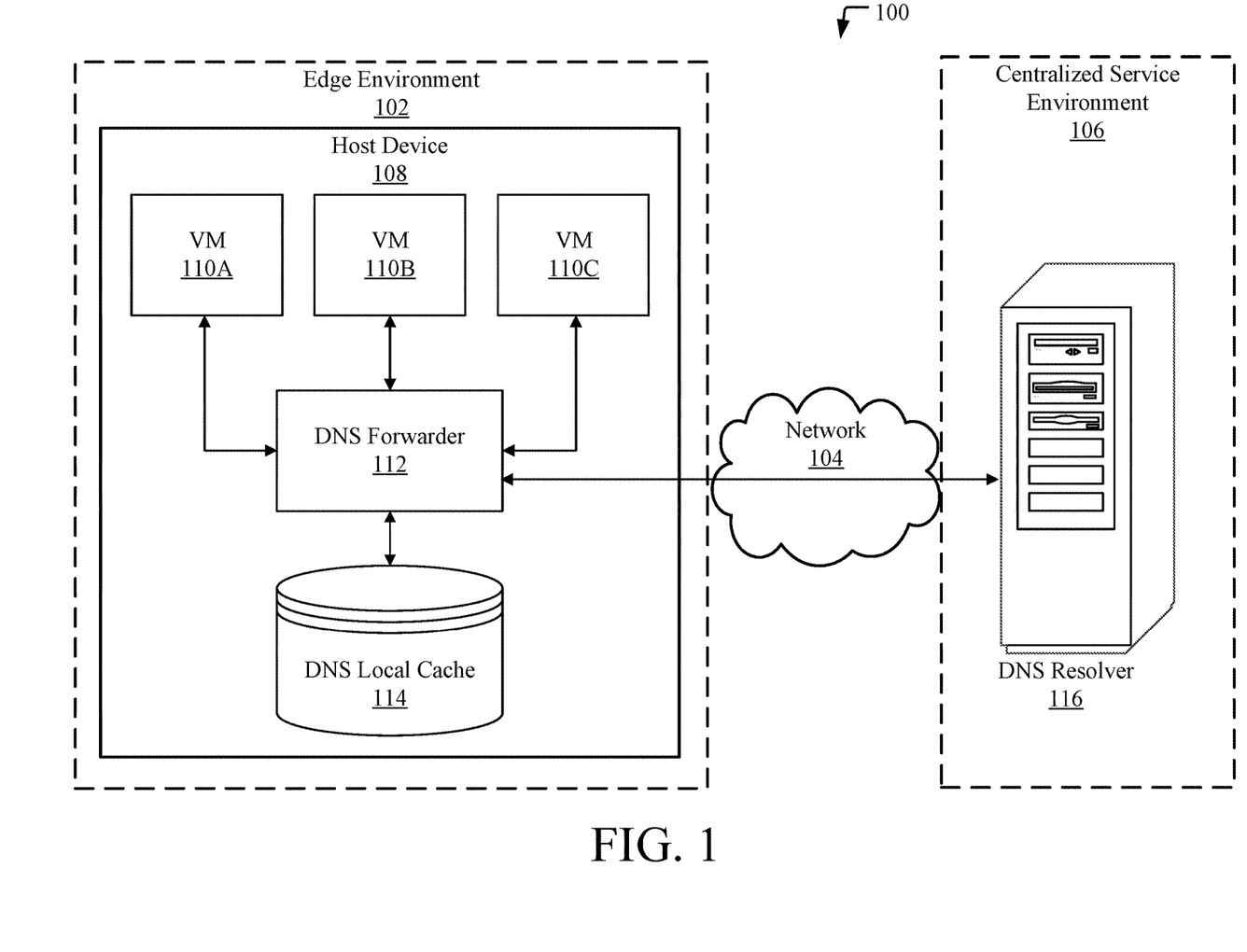
FIG. 1 illustrates an example system that implements a host DNS local cache to enable DNS resolution during network connectivity issues.

FIG. 1 illustrates a system that implements a host DNS local cache to enable DNS resolution during network connectivity issues between computing environments and DNS services. System 100, as presented, is a combination of interdependent components that interact to form an integrated whole. Components of system 100 may be hardware components or software components (e.g., application programming interfaces (APIs), modules, runtime libraries) implemented on and/or executed by hardware components of system 100. In one example, components of system 100 are distributed across multiple processing devices or computing systems.

In FIG. 1, system 100 comprises edge environment 102, network 104, and centralized service environment 106. The scale and structure of devices and environments discussed herein may vary and may include additional or fewer components than those described in FIG. 1 and subsequent figures. Further, although examples in FIG. 1 and subsequent figures will be discussed in the context of VMs and edge computing environments, the examples are equally applicable to other virtualization techniques (e.g., containers), virtual environments, and computing paradigms (e.g., parallel computing, cluster computing, fog computing).

Edge environment 102 is an edge computing environment that provides services and resources (e.g., applications, devices, storage, processing power, networking, analytics, intelligence) associated with a centralized datacenter to users of a specific geographical region or area (e.g., country, state, city, neighborhood, building). Edge environment 102 may be located in geographical regions or areas that are physically (and/or logically) in close proximity to users of the services and resources. In one example, a first edge environment is located in close physical proximity to users in a first location and a second edge environment is located in close physical proximity to users in a second location. The first edge environment provides increased response times for data transactions for users in the first location, and the second edge environment provides increased response times for data transactions for users in the second location. Edge environment 102 provides an entry point for devices to access service environments or service provider networks, such as centralized service environment 106.

Edge environment 102 comprises host device 108. In examples, host device 108 implements specialized software (e.g., applications, services, machine learning (ML) models, computer code segments) associated with centralized service environment 106. The software facilitates processing of workloads executed on host device 108. A workload refers to an application, service, capability, or a specific amount of work that can be processed. In a specific example, a workload refers to a VM or a container. Examples of host device 108 include server devices (e.g., web servers, file servers, application servers, database servers), personal computers (PCs), and Internet of Things (IOT) devices. Alternatives to host device 108 include network devices (e.g., routers, network switches, network gateways, firewalls). Host device 108 comprises VMs 110A, 110B, and 110C (collectively referred to as "VM(s) 110"), DNS forwarder 112, and DNS local cache 114.

VM(s) 110 are compute resources that use software instead of a physical computing device to execute and deploy services and applications. Virtual environment monitoring software of host device 108, such as a hypervisor, may be used to create, execute, and manage VM(s) 110 and to provide VM(s) 110 access to physical resource (e.g., memory, processing, storage) of host device 108. In examples, VM(s) 110 receive or create information requests for data resources, such as web sites, webpages, and documents. As part of the information requests, VM(s) 110 generate DNS requests to access IP address information for a domain name associated with the data resources. The DNS requests are provided to DNS forwarder 112.

DNS forwarder 112 is a component (e.g., service, device, or other software) that forwards received DNS requests to designated DNS resolution components (e.g., services, devices, or other software) and returns DNS responses to DNS requestors. In examples, DNS forwarder 112 receives DNS requests from VM(s) 110. Upon receiving a DNS request, DNS forwarder 112 determines whether one or more DNS resolvers, such as DNS resolver 116, are currently reachable (e.g., online and accepting connections). Determining whether DNS resolver 116 is reachable comprises, for example, evaluating a heartbeat transmission received from DNS resolver 116, transmitting a status query to DNS resolver 116, or transmitting the DNS request to DNS resolver 116. In examples, DNS forwarder 112 sends and receives transmissions to DNS resolver 116 using network 104. Examples of network 104 include a private area network (PAN), a local area network (LAN), a wide area network (WAN), and the like. Although network 104 is depicted as a single network, it is contemplated that network 104 may represent several networks of similar or varying types.

If DNS forwarder 112 determines that DNS resolver 116 is reachable based on the heartbeat transmission or the response from DNS resolver 116, DNS forwarder 112 transmits the DNS request to DNS resolver 116 and/or receives a corresponding DNS response from DNS resolver 116. DNS forwarder 112 stores the DNS response information in a local cache of host device 108, such as DNS local cache 114. If the local cache already comprises DNS response information for the domain name in the DNS request, DNS forwarder 112 may overwrite the previous DNS response information or update one or more portions of the previous DNS response information using the current DNS response information. In some examples, storing the DNS response information comprises generating a key, associating the key with the DNS response, and storing the key and the DNS response in the local cache. DNS forwarder 112 then provides the current DNS response to VM(s) 110.

If DNS forwarder 112 determines that DNS resolver 116 is unreachable based on the heartbeat transmission or the lack of response from DNS resolver 116, DNS forwarder 112 searches the DNS local cache 114 to determine whether the DNS local cache 114 comprises an entry matching the domain name provided in the DNS request. If a matching entry is not found in the DNS local cache 114, DNS forwarder 112 provides a response to VM(s) 110 indicating that the domain name could not be resolved. If, however, a matching entry is found in the DNS local cache 114, DNS forwarder 112 retrieves the DNS response associated with the entry and provides the DNS response to VM(s) 110. In some examples, DNS forwarder 112 alters stored transaction identifiers for the retrieved DNS response to match transaction identifiers for the current DNS request from VM(s) 110.

DNS local cache 114 stores entries for DNS responses that are associated with DNS requests from VM(s) 110. DNS local cache 114 is stored locally by host device 180 and may be implemented as part of (or separate from) DNS forwarder 112. The entries stored by DNS local cache 114 are accessible by each of VM(s) 110 regardless of whether a VM 110 has previously submitted a DNS request for a particular domain name stored in DNS local cache 114. In examples, DNS local cache 114 stores DNS response information in the form of a key/value pair, as discussed above. For instance, a key may be comprised of DNS response information, such as domain name, DNS record type, network protocol, virtual environment VNET identifier, and/or transaction identifier. The corresponding value for the key may be comprised of the raw (or processed) data for the DNS response and a timestamp indicating the most recent time that the domain name was requested from DNS resolver 116. In some examples, entries in DNS local cache 114 are removed based on a maximum number of entries permitted for DNS local cache 114, an expiration time associated with the entries (e.g., a TTL value), and/or a maximum memory size permitted for DNS local cache 114. For instance, all entries having a TTL value older than one week may be removed from DNS local cache 114.

Centralized service environment 106 provides VM(s) 110 access to various computing services and resources, as discussed with respect to edge environment 102. In examples, centralized service environment 106 is implemented in a cloud computing environment or another type of distributed computing environment and is subject to one or more distributed computing models/services (e.g., Infrastructure as a Service (IaaS), Platform as a Service (PaaS), Software as a Service (SaaS), Functions as a Service (FaaS)). Centralized service environment 106 comprises hardware and/or software components, such as DNS resolver 116.

DNS resolver 116 (also known as a recursive resolver) is a service or a computing device, such as a server device, that resolves (e.g., converts) domain names into IP addresses or retrieves resolved domain names from another service or device. In examples, upon receiving a DNS request from DNS forwarder 112, DNS resolver 116 forwards the domain name in the DNS request to one or more name servers, such as a DNS root name server or a Top-Level Domain (TLD) name server. The name server(s) return an IP address corresponding to the domain name to DNS resolver 116. DNS resolver 116 returns the IP address as part of a DNS response to DNS forwarder 112 via network 104. In some examples, the DNS response comprises a transaction identifier, the domain name, a DNS record type, a response code for the DNS request, the number of DNS records returned by the DNS request, the DNS records, TTL values, a DNS response data length, a network protocol, and/or a virtual environment VNET identifier.

Figure 2:
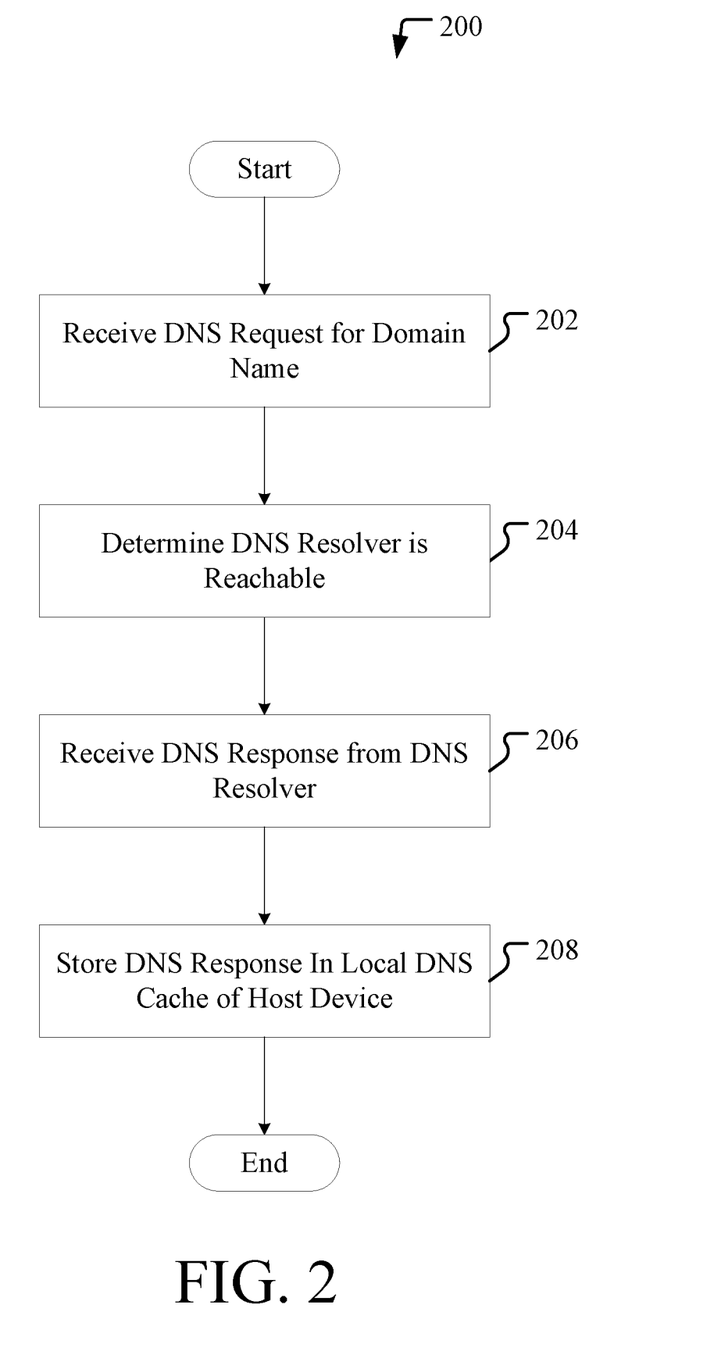
FIG. 2 illustrate an example process for populating a host DNS local cache.
Figure 3:
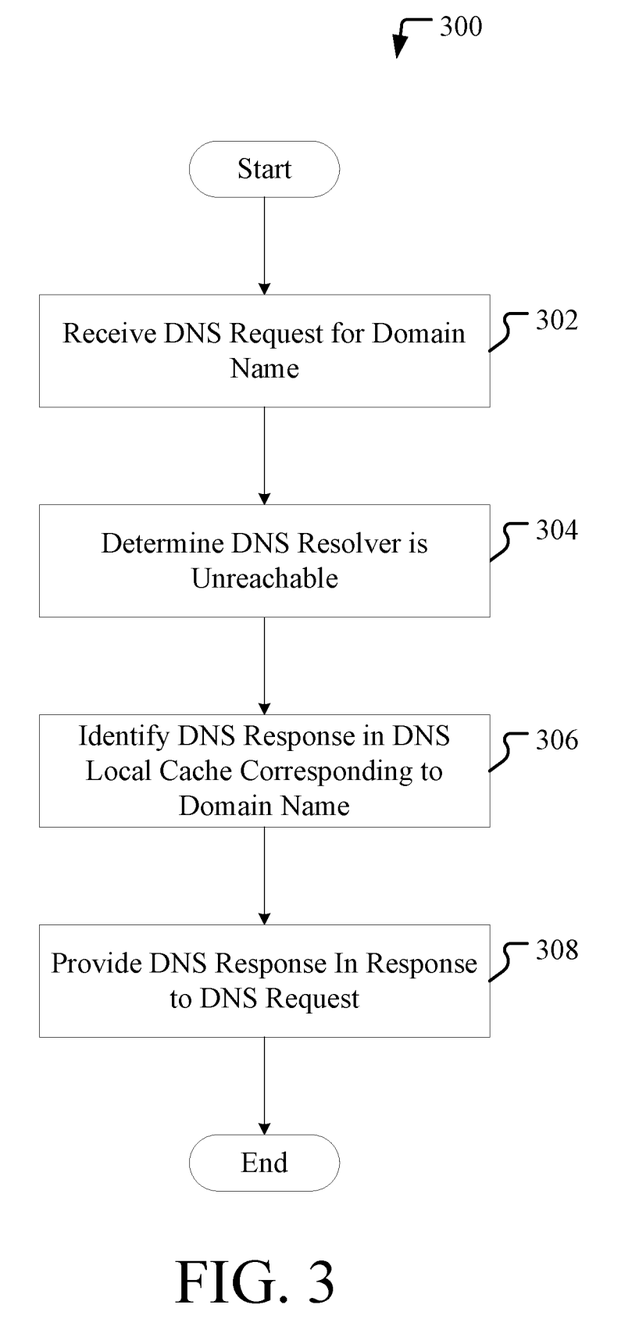
FIG. 3 illustrates an example method for a host DNS local cache to enable DNS resolution during network connectivity issues.

Having described a system that may be employed by the embodiments disclosed herein, methods that may be performed by such a system are now provided. Although methods 200-300 are discussed in the context of system 100 of FIG. 1, the performance of methods 200-300 are not limited to such examples.

FIG. 2 illustrates an example method for populating a host DNS local cache. Method 200 begins at operation 202, where a DNS request is received. In examples, a DNS forwarder, such as DNS forwarder 112, receives the DNS request from a virtual environment, such as VM(s) 110. The DNS forwarder and the virtual environment are implemented in a common computing environment, such as the operating system of host device 108. In at least one example, the common computing environment is located in an edge computing environment, such as edge environment 102. The DNS request comprises a domain name associated with one or more data resources, such as a webpage or a document. For instance, the DNS request may include the domain name "microsoft.com."

At operation 204, DNS forwarder determines a DNS resolver is reachable. In examples, a DNS resolver, such as DNS resolver 116, is implemented in a computing environment external to the computing environment of the DNS forwarder, such as centralized service environment 106. The DNS forwarder attempts to determine whether the DNS resolver is currently reachable by evaluating a transmission from the DNS resolver, such as a heartbeat transmission from the DNS resolver, a status query submitted to the DNS resolver, or a response to the DNS request. Based on the transmission from the DNS resolver, the DNS forwarder determines the DNS resolver is reachable. As one example, if a heartbeat transmission from the DNS resolver has been detected by the DNS forwarder within a threshold amount of time, the DNS forwarder determines the DNS resolver is reachable. Upon determining the DNS resolver is reachable, the DNS forwarder provides the DNS request to the DNS resolver (if the DNS forwarder has not already provided the DNS request to the DNS resolver as part of the reachability determination).

At operation 206, the DNS forwarder receives a DNS response from the DNS resolver. In examples, the DNS response comprises information associated with the domain name in the DNS request, such as a transaction identifier (e.g., "53255", the domain name (e.g., "microsoft.com"), a DNS record type (e.g., "A"), a response code for the DNS request (e.g., "success"), the number of DNS records returned by the DNS request (e.g., "1"), the DNS records (e.g., 10.10.1.5), a TTL value (e.g., "3600 seconds"), a DNS response data length (e.g., "125 bytes"), a network protocol (e.g., "UDP"), and a virtual environment VNET identifier (e.g., 2d4d028de3015345da9420df5514dad0).

At operation 208, the DNS forwarder stores the DNS response in a DNS local cache. In examples, a DNS local cache, such as DNS local cache 114, is implemented in the computing environment common to the DNS forwarder and the virtual environment. For instance, the DNS local cache may be implemented as part of the DNS forwarder or by a host device that is implementing the DNS forwarder. In some examples, the DNS forwarder stores the DNS response and/or information associated with the DNS response in key/value(s) format such that the key portion is a primary key for the DNS response and the value portion is the DNS response and/or associated information. For instance, the DNS forwarder may generate a primary key comprising the domain name, DNS record type, network protocol, and the VNET identifier for the DNS response (e.g., "microsoft.com::A::UDP::2d4d028de3015345da9420df5514dad0," where the individual values are delimited using "::") and a corresponding value portion comprising the DNS record and a last-used timestamp for the DNS response (e.g., "10.10.1.5::November 5, 2022 12:03:22," where the individual values are delimited using "::"). In other examples, the DNS forwarder stores the DNS in alternative format, such as a list of delimited values or such that each individual value in the DNS response is in a separate column of a row. In examples in which the DNS local cache includes a previously stored entry for the domain name in the DNS request, the DNS forwarder may overwrite or update the previously stored entry.

FIG. 3 illustrates an example method for using a host DNS local cache to enable DNS resolution during network connectivity issues between computing environments and DNS services. Method 300 begins at operation 302, where a DNS request is received, as discussed with respect to operation 202 of Method 200.

At operation 304, DNS forwarder determines a DNS resolver is unreachable. In examples, the DNS forwarder determines that the DNS resolver is unreachable as discussed with respect to operation 204 of Method 200. As one example, if the DNS forwarder receives a status response from the DNS resolver indicating that the DNS resolver is offline or otherwise currently unavailable to the DNS forwarder, the DNS forwarder determines that the DNS resolver is unreachable. Upon determining the DNS resolver is unreachable, the DNS forwarder may reattempt to reach the DNS resolver or identify one or more times at which the DNS forwarder will reattempt to reach the DNS resolver. Alternatively, the DNS forwarder may mark the attempt to reach the DNS resolver as failed.

At operation 306, the DNS forwarder identifies an entry in the DNS local cache corresponding to the domain name in the DNS request. In examples, the DNS forwarder searches or queries the DNS local cache for an entry comprising a domain name that matches the domain name in the DNS request. Searching or querying the DNS local cache may include using techniques, such as regular expressions, fuzzy logic, or other pattern matching techniques. Upon identifying a matching entry in the DNS local cache, the DNS forwarder extracts a corresponding DNS response associated with the entry. For instance, if an entry comprising "microsoft.com" is associated with (e.g., paired to or stored with) the stored DNS response "10.10.1.5," the DNS forwarder extracts the stored DNS response. In some examples, the DNS forwarder alters a transaction identifier for the stored DNS response to match a transaction identifier for the current DNS request. For instance, although the TTL value for the stored DNS response has expired, the DNS forwarder extracts the DNS response and corresponding transaction identifier for the stored DNS response, then updates the transaction identifier to the transaction identifier for the current DNS request.

At operation 308, the DNS forwarder provides at least a portion of the DNS response from the DNS local cache to the virtual environment that submitted the DNS request. For instance, the IP address "10.10.1.5" is provided to a virtual environment in response to a DNS request for the domain name "microsoft.com." In examples, DNS responses stored in the DNS local caches are accessible by each virtual environment hosted by the host device that is implementing the DNS forwarder. For instance, even if a virtual environment has not previously submitted a DNS request for a domain name, the virtual environment is able to access the DNS response stored in the DNS local cache for that domain name.

Figure 4:
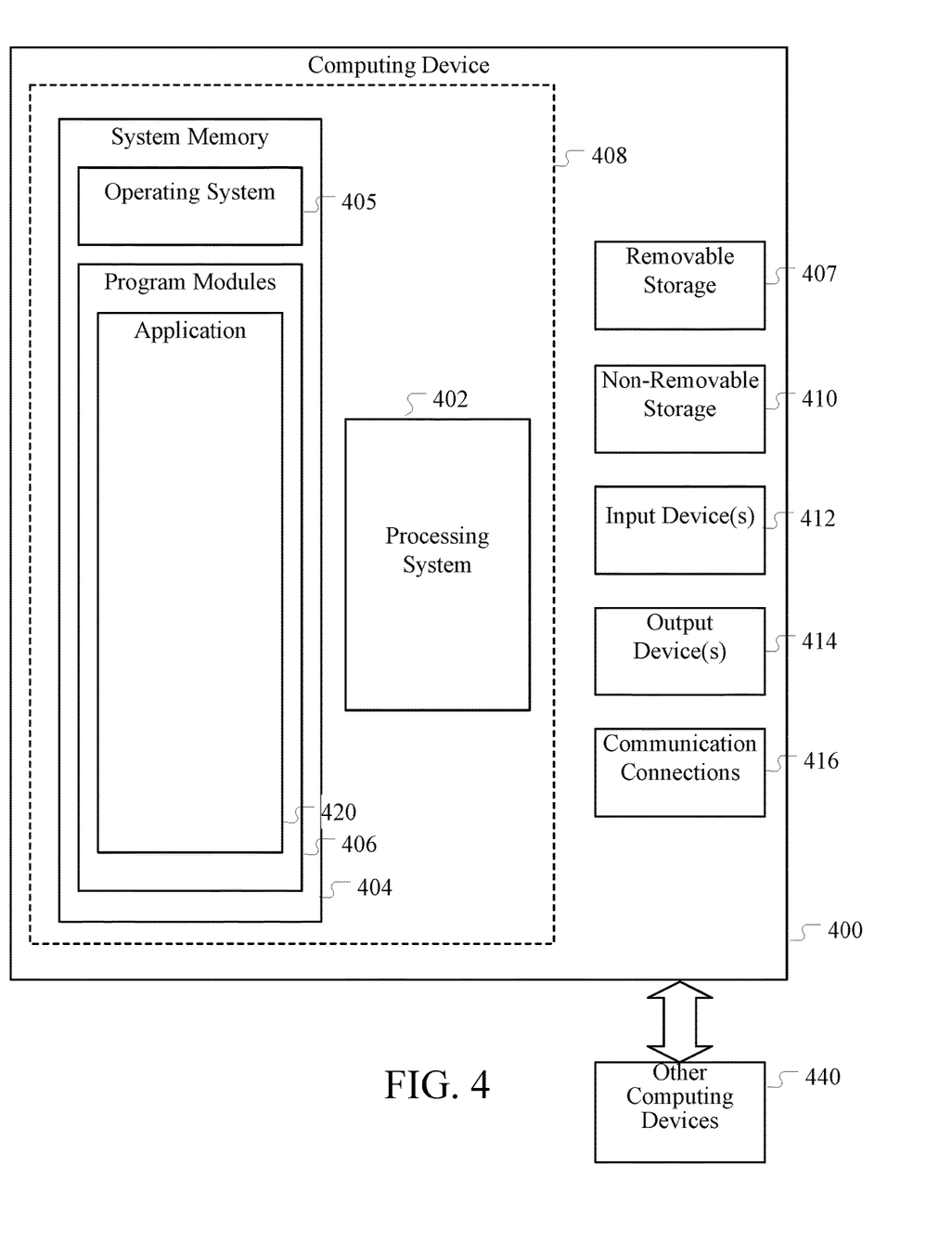
FIG. 4 is a block diagram illustrating example physical components of a computing device for practicing aspects of the disclosure.
Figure 5:
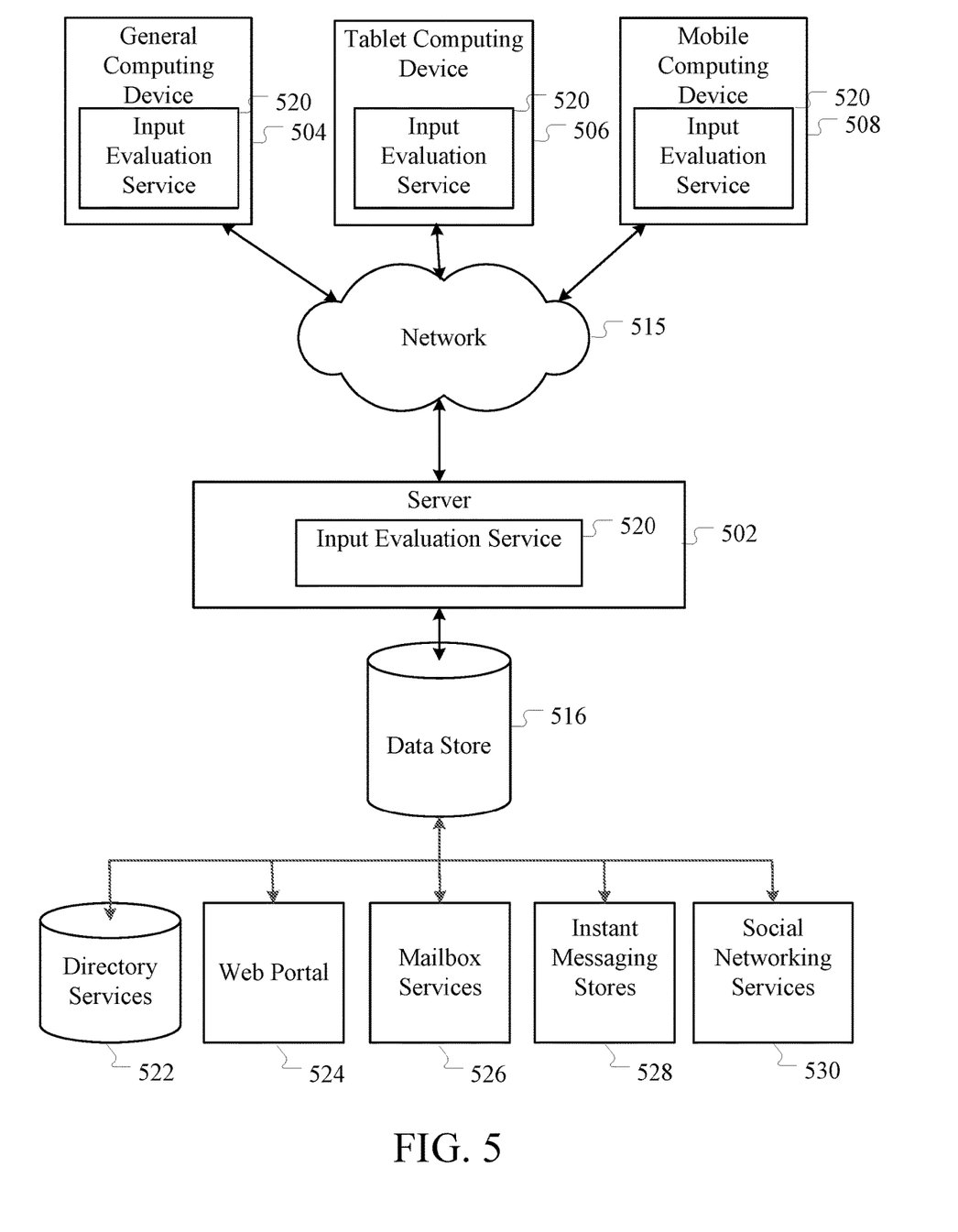
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing system 402 comprising processing unit(s) and a system memory 404. Depending on the configuration and type of computing device, the system memory 404 may comprise volatile storage (e.g., random access memory (RAM)), non-volatile storage (e.g., read-only memory (ROM)), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, or optical disks. Such additional storage is illustrated in FIG. 4 by a removable storage device 407 and a non-removable storage device 410.

As stated above, a number of program modules and data files may be stored in the system memory 404. While executing on the processing unit 402, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

As will be understood from the foregoing disclosure, one example of the technology relates to a system comprising: a processing system; and memory coupled to the processing system, the memory comprising computer executable instructions that, when executed by the processing system, perform operations comprising: receiving a domain name system (DNS) request from a first virtual environment executed by a host device, the DNS request comprising a domain name; determining a DNS resolver external to the host device is unreachable; in response to the determining the DNS resolver is unreachable, identifying an entry corresponding to the domain name in a DNS local cache implemented by the host device, the entry comprising a DNS response associated with the domain name; and providing the DNS response to the first virtual environment in response to the DNS request.

In another example, the technology relates to a computer-implemented method. The method comprises: receiving, by a domain name system (DNS) forwarder, a DNS request from a virtual environment executed by a host device, the DNS request comprising a domain name; determining, by the DNS forwarder, a DNS resolver located separately from the DNS forwarder is unreachable; in response to the determining the DNS resolver is unreachable, identifying, by the DNS forwarder, a DNS record corresponding to the domain name stored within a DNS local cache implemented by the host device, the entry comprising a DNS response associated with the domain name; and providing, by the DNS forwarder, the DNS response to the virtual environment in response to the DNS request.

In another example, the technology relates to a device comprising: a processing system; and memory coupled to the processing system, the memory comprising computer executable instructions that, when executed by the processing system, perform operations comprising: receiving, by a domain name system (DNS) forwarder, a DNS request from a virtual environment executed by the device, the DNS request comprising a domain name; determining a DNS resolver located separately from the DNS forwarder is unreachable; in response to the determining the DNS resolver is unreachable, identifying a DNS record corresponding to the domain name is stored within a DNS local cache implemented by the device, the entry comprising an IP address associated with the domain name; and providing the IP address to the virtual environment in response to the DNS request.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
  a processing system; and
  memory coupled to the processing system, the memory comprising computer executable instructions that, when executed by the processing system, perform operations comprising:
    receiving, by a domain name system (DNS) forwarder mechanism implemented by a host device, a DNS request from a first virtual environment executed by the host device, the DNS request comprising a domain name, the host device further implementing a DNS local cache;
    prior to searching the DNS local cache for a DNS record corresponding to the domain name, determining, by the DNS forwarder mechanism, a DNS resolver external to the host device is unreachable;
    in response to the determining the DNS resolver is unreachable, identifying, by the DNS forwarder mechanism, an entry corresponding to the domain name in a DNS local cache implemented by the host device, the entry comprising a DNS response associated with the domain name; and
    providing, by the DNS forwarder mechanism, the DNS response to the first virtual environment in response to the DNS request.

2. The system of claim 1, wherein the virtual environment is a virtual machine or a container.

3. The system of claim 1, wherein the DNS forwarder has direct access to the DNS local cache.

4. The system of claim 1, wherein the host device comprises a second virtual environment, the second virtual environment having access to the DNS local cache via the DNS forwarder.

5. The system of claim 4, wherein the second virtual environment has access to the DNS response without having submitted a previous DNS request for the domain name.

6. The system of claim 1, wherein the host device in located in an edge computing environment and the DNS resolver is located in a centralized service environment that is separate from the edge computing environment.

7. The system of claim 1, wherein determining the DNS resolver is unreachable comprises evaluating a transmission from the DNS resolver, the transmission being one of:
  a heartbeat transmission from the DNS resolver;
  a status query submitted to the DNS resolver; or
  a response to the DNS request.

8. The system of claim 1, wherein identifying the entry corresponding to the domain name is in the DNS local cache comprises:
  searching the DNS local cache for the domain name; and
  matching the domain name to information stored in the entry.

9. The system of claim 8, wherein identifying the entry corresponding to the domain name is in the DNS local cache further comprises:
  altering a previously received transaction identifier for the entry to match a current transaction identifier for the DNS request.

10. The system of claim 9, wherein the entry comprises a time to live value that has expired, the time to live value indicating an amount of time the entry for the domain name is valid.

11. The system of claim 1, wherein the entry is associated with a primary key and stored data comprising the DNS response.

12. The system of claim 11, wherein the primary key comprises the domain name and a virtual network identifier for the virtual environment.

13. The system of claim 12, wherein the primary key further comprises a DNS record type and a network protocol type.

14. The system of claim 11, wherein the stored data further comprises a last used timestamp indicating a most recent time that the domain name was requested from the DNS resolver.

15. The system of claim 1, wherein the DNS response comprises an internet protocol (IP) address for the domain name.

16. A method comprising:
   receiving, by a domain name system (DNS) forwarder implemented by an operating system of a host device, a DNS request from a virtual environment executed by the operating system of the host device, the DNS request comprising a domain name;
   determining, by the DNS forwarder, a DNS resolver located separately from the DNS forwarder is unreachable;
   in response to the determining the DNS resolver is unreachable, identifying, by the DNS forwarder, a DNS record corresponding to the domain name stored within a DNS local cache implemented by the host device, the DNS record comprising a DNS response associated with the domain name, wherein the DNS forwarder does not perform recursive DNS searches in response to determining the DNS record has expired; and
   providing, by the DNS forwarder, the DNS response to the virtual environment in response to the DNS request.

17. The method of claim 16, wherein the DNS forwarder enables other virtual environments of the host device to access the DNS local cache.

18. The method of claim 16, wherein the DNS response comprises a plurality of internet protocol (IP) addresses for the domain name.

19. The method of claim 16, wherein the DNS local cache supports an in-memory caching mode and a persistent caching mode.

20. A device comprising:
   a processing system; and
   memory comprising computer executable instructions that, when executed, perform operations comprising:
      receiving, by a domain name system (DNS) forwarder implemented by the device, a DNS request from a virtual environment executed by the device, the DNS request comprising a domain name, the device further implementing a DNS local cache;
      prior to searching the DNS local cache for a DNS record corresponding to the domain name, determining, by the DNS forwarder, a DNS resolver located separately from the device is unreachable;
      in response the determining the DNS resolver is unreachable, identifying, by the DNS forwarder, the DNS record is stored within the DNS local cache, the DNS record being unexpired and comprising an IP address associated with the domain name; and
      providing, by the DNS forwarder, the IP address to the virtual environment in response to the DNS request.

* * * * *